United States Patent Office 2,840,609
Patented June 24, 1958

2,840,609

HYDROGENATION PROCESS FOR PREPARING 1,8-OCTANEDIOIC ACIDS FROM CERTAIN DILACTONES WITH A PLATINUM CATALYST

John C. Sauer, Wilmington, Del., assignor to E. I. du Pont de Nemours and Company, Wilmington, Del., a corporation of Delaware No Drawing. Application September 28, 1956
Serial No. 612,870

8 Claims. (Cl. 260—537)

This invention relates to the production of 1,8-octanedioic acids, i. e., suberic acid and substituted suberic acids. More particularly this invention relates to a novel catalytic process for converting certain dilactones into suberic acid and substituted suberic acids.

This application is a continuation-in-part of my copending application Ser. No. 549,155, filed November 25, 1955, which later application is a continuation-in-part of my application Ser. No. 432,599, filed May 26, 1954, now abandoned.

When acetylenes are reacted with carbon monoxide in the presence of a catalytic amount of a cobalt carbonyl, as described in my copending patent application Ser. No. 549,155, filed November 25, 1955, as a continuation-in-part of Ser. No. 432,599, filed May 26, 1954, now abandoned, there are obtained new dilactones corresponding to $C_8(RR')_2O_4$, wherein R and R' are hydrogen, haloaryl, alkoxyaryl, or hydrocarbon radicals free from non-aromatic unsaturation, and which show strong lines in the ultraviolet spectra in the region of 3300–4400 A., and yield suberic acids on hydrogenation over platinum in acetic acid. When acetylene is reacted with carbon monoxide in the presence of a catalytic amount of cobalt carbonyl, as described in my aforesaid patent applications there is obtained [$\Delta^{2,2'(5H,5'H)}$-bifuran]-5,5'-dione.

It is an object of this invention to provide a new process for the preparation of 1,8-octanedioic acids, i. e., suberic acid and substituted suberic acids. A further object of this invention is to provide a novel catalytic process for converting certain dilactones into suberic acid and substituted suberic acids. A still further object is to convert abundantly available and relatively inexpensive carbon monoxide and acetylenes in two steps to suberic acid and substituted suberic acids. Other objects will appear hereinafter.

These and other objects of this invention are accomplished by the following process for preparing 1,8-octanedioic acids which comprises hydrogenating in an organic solvent and in contact with a platinum catalyst a dilactone having the formula $C_8(RR')_2O_4$, wherein R and R' are hydrogen, haloaryl, alkoxyaryl or monovalent hydrocarbon radicals free from non-aromatic unsaturation. This invention particularly provides a novel method for preparing suberic acid which comprises hydrogenating [$\Delta^{2,2'(5H,5'H)}$-bifuran]-5,5'-dione in an organic solvent and in contact with a platinum catalyst.

The dilactones employed as starting materials in this invention are described and claimed in my aforesaid applications Ser. No. 432,599 and Ser. No. 549,155, of which said present application is a continuation-in-part.

The hydrogenation of the dilactone in accordance with this invention takes place at ordinary room temperatures, i. e., about 25° C. If desired, however, temperatures below room temperature, i. e., as low as 0° C., can be used but under these conditions the reaction is slower. Likewise, temperatures above room temperature, e. g. up to 50° C., can be used but this usually has no practical advantage.

The process can be operated at atmospheric pressure, or at pressures which are slightly above atmospheric. Since no advantages appear to accrue from the use of pressures above 500 lb./sq. in., this constitutes a practical upper limit of pressure.

The amount of platinum is at least 0.01% by weight of the dilactone. Because the rate at which the reaction takes place is improved by increasing the catalyst concentration, usually an amount is used which is in the range of 0.1–30% by weight of the dilactone being hydrogenated.

Platinum catalysts of various types known to the art can be used. For instance, metallic platinum, or platinum extended on any one of the known acid-resistant supports can be used. During the process, platinum compounds, i. e., oxide or salts, are reduced to metallic platinum. A suitable platinum catalyst is one prepared by depositing platinum chloride on charcoal in amount sufficient to provide 10 g. of platinum per liter of catalyst. This is equivalent to 2% platinum on the charcoal.

A catalyst is prepared by dissolving a quantity of chloroplatinic acid equivalent to 1.5 g. of platinum in 150 ml. of distilled water. Coconut charcoal of 4–14 mesh is purified by heating in a stream of hydrogen at 450° C. for approximately 20 hours, followed by heating at 100° C. in 10% nitric acid for 6 hours. The charcoal is then washed with distilled water, dried at 100° C. and the last traces of nitric acid are removed by heating the charcoal for one hour at 450° C. in a stream of nitrogen. The chloroplatinic acid is poured over 150 ml. of the purified charcoal and the mixture is heated on a steam bath until it is dry.

The hydrogenation of the dilactone is effected in solution and acetic acid, dioxane, ethyl acetate, tetrahydrofuran, dimethylformamide, and ethylene glycol diacetate are convenient media. In place thereof, however, other polar solvents can be used. The amount of reaction medium is not critical and it can equal or exceed the weight of the dilactone, e. g. it may be ten times the weight of the dilactone or even more.

Although charcoal is particularly convenient as the support, it is to be understood that other known extenders can be employed.

The following examples will serve to illustrate the invention.

EXAMPLE I

A resublimed sample (1.8 g.) of [$\Delta^{2,2'(5H,5'H)}$-bifuran]-5,5'-dione was placed in a closed reactor together with 170 ml. of acetic acid and 0.15 g. of platinum oxide catalyst. The mixture was then reacted with hydrogen at 10 to 27 lb./sq. in. pressure at room temperature for one hour and 45 minutes. Between 4 and 5 mole equivalents of hydrogen were absorbed during this time. New catalyst, 0.10 g., was then added but absorption was very low and slow during the next hour and 40 minutes. The reaction mixture was separated from the catalyst and the acetic acid removed under vacuum. The solid remaining in the flask was recrystallized from water, M. P. 127–130° C. Infrared analysis indicated almost pure suberic acid with an impure band at the lactone position. This sample was converted to the p-toluidide, melting point 210–212° C. A recrystallization from acetone did not raise the melting point to the reported 218° C. value. A mixed melting point with an authentic sample of the p-toluidide showed no depression. The hydrogen absorbed in the reaction beyond that needed for saturation of the carbon-carbon double bonds was required for hydrogenolysis of the lactone linkages.

Corresponding substituted suberic acids are obtained analogously from starting materials of the formula given above where R and R' are other than hydrogen atoms.

EXAMPLE II

The dilactone $C_{16}H_{20}O_4$, [$\Delta^{2,2'(5H,5'H)}$-bi(n-butylfuran)]-5,5'-dione, was hydrogenated in acetic acid, using a platinum catalyst. The hydrogenation gave a hydrogen number of 0.0360 (0.0345) grams hydrogen per gram sample which corresponds closely to the absorption of 5 moles of hydrogen per mole of sample. The crude acid obtained was converted to the dianilide which melted at 136–140° C. and was found to analyze as follows:

*Analysis.*—Calculated for $C_{28}H_{40}O_2N_2$: N, 6.4%. Found: N, 6.41%, 6.54%.

The infrared absorption spectra of the dianilide is given in the following table.

Table

| | | |
|---|---|---|
| 3.05 | S | —NH. |
| 3.13 | M | —NH. |
| 3.20 | M | —NH and/or =CH. |
| 5.15 | VW | φ group. |
| 5.35 | VW | φ group. |
| 5.68 | W | probably C=O impurity. |
| 6.02 | S | amide C=O. |
| 6.16 | M | amide or arom. —C=C—. |
| 6.24 | S | arom. —C=C—. |
| 6.47 | S | secondary amide. |
| 6.70 | S | arom. —C=C—. |
| 7.65 | S | |
| 13.20 | S | C—H of φ, monosubstituted benzene ring. |
| 13.75 | M | |
| 14.45 | S | C—H of φ, monosubstituted benzene ring. |

EXAMPLE III

A reactor was charged with 21.2 g. of the dilactone of Example I, 325 ml. of ethylene glycol diacetate, and 0.04 g. of platinum oxide catalyst. This charge was shaken with hydrogen at 40 lb./sq. in. at room temperature. After hydrogen absorption had substantially stopped another 0.04 g. of catalyst was added and the hydrogenation continued. This procedure was repeated once more. The total hydrogen absorption corresponded to approximately 5 moles of hydrogen per mole of dilactone. The product was filtered to give 8.6 g. of suberic acid, M. P. 141–142° C., after recrystallization from methyl ethyl ketone. The filtrate was evaporated to dryness under reduced pressure. From the residue there was crystallized another 4.3 g. of suberic acid.

EXAMPLE IV

Example III was repeated with a charge consisting of 1.25 g. of the dilactone, 100 ml. of dimethylformamide, and 0.03 g. of platinum oxide catalyst. The hydrogenation was carried on at 45 lb./sq. in. for 6.5 hours. Absorption corresponded to 66% of theoretical. The filtered product was evaporated to dryness and the residue extracted with chloroform to give 0.26 g. of crude suberic acid.

The [$\Delta^{2,2'(5H,5'H)}$-bifuran]-5,5'-dione, used in Examples I, III and IV, was prepared by charging into a steel pressure reactor of 400 cc. capacity 26 g. of acetylene, 200 ml. of acetone, and 1.5 g. of dicobalt octacarbonyl. The mixture was heated with carbon monoxide at a pressure of 1000 atmospheres for 14–17 hours. The product was filtered and the brown solid was extracted with ethyl acetate for 24 hours. The extract was permitted to crystallize and the crystalline material was separated, and dried at room temperature. There was obtained 20 g. of the unsaturated dilactone, $C_8H_4O_4$, M. P. 229° C. after several recrystallizations from acetic acid.

The [$\Delta^{2,2'(5H,5'H)}$-bifuran]-5,5'-dione exists in the form of two structural isomers; the normal or low melting form, 230–237° C. is the trans form and the high melting form, 240–248° C. is the cis form. The formula of these structural isomers of [$\Delta^{2,2'(5H,5'H)}$-bifuran]-5,5'-dione can be represented as follows:

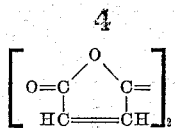

The di-n-butyldilactone, $C_{16}H_{20}O_4$, used in Example II was prepared as follows:

A pressure reactor was charged with 100 ml. of acetone, 2 g. of cobalt carbonyl, and 82 g. of n-butylacetylene, and the charge heated at 95–120° C. under a carbon monoxide pressure of 700–900 atmospheres. These conditions were maintained for 18 hours, during which time the pressure was maintained at the indicated level by periodically repressuring with carbon monoxide. The crude reaction mixture was discharged from the reactor and distilled. The product from the fraction distilling at 190–205° C./2 mm. crystallized upon standing. A portion of the distillate was recrystallized from petroleum ether containing a small amount of ethyl acetate. After two recrystallizations the cream colored solid had a block melting point of 124° C. and was found to analyze as follows:

*Analysis.*—Calc'd. for $C_{16}H_{20}O_4$: C, 69.50; H, 7.30; M. W., 276. Found: C, 69.20; H, 7.36; M. W., 270, 270.

The ultraviolet absorption spectra show a strong peak at 3475 A. and a weak peak at 2600 A. (the specific absorptivity $k_{3475A.}=144$), which corresponds closely to the spectra of the unsubstituted dilactone.

The dilactones employed in this invention correspond to $C_8(RR')_2O_4$, wherein the R and R' are hydrogen, alkoxyaryl, especially where the alkoxy radical is not more than 12 carbon atoms and the aryl radical is hydrocarbon of not more than 10 carbon atoms, haloaryl, especially chloroaryl where the aryl radical is hydrocarbon of not more than 10 carbon atoms, or monovalent hydrocarbon radicals free from non-aromatic unsaturation, especially of not more than 12 carbon atoms, e. g., alkyl, especially short chain alkyl, i. e., containing less than 7 carbon atoms, aryl, especially where the aryl radical is hydrocarbon of not more than 7 carbon atoms, aralkyl, especially of not more than 7 carbon atoms, or cycloalkyl, particularly of not more than 7 carbon atoms. Examples of such radicals are methyl, ethyl, octyl, decyl, dodecyl, phenyl, tolyl, xylyl, benzyl, cyclohexyl, naphthyl, methylcyclohexyl, methoxyphenyl, ethoxyphenyl, decyloxyphenyl, dodecyloxyphenyl, dodecycloxynaphthyl, chlorophenyl, chloronaphthyl, and the like. These dilactones show strong lines in the ultraviolet spectra in the region of 3300–400 A. and yield suberic acids on hydrogenation over platinum in acetic acid.

These unsaturated dilactones can be represented by the general formula

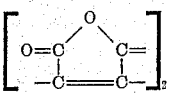

where one of the ring doubly bonded carbon atoms has its free valence satisfied by R and the other of the ring doubly bonded carbon atoms has its free valence satisfied by R', with R and R' being defined as aforesaid.

As illustrative of these new dilactones corresponding to the formula $C_8(RR')_2O_4$, there are disclosed in my copending application Serial No. 549,155, the following substituted dilactones:

[$\Delta^{2,2'(5H,5'H)}$-bi(phenylfuran)]-5,5'-dione
[$\Delta^{2,2'(5H,5'H)}$-bi(diethylfuran)]-5,5'-dione
[$\Delta^{2,2'(5H,5'H)}$-bi(n-butylfuran)]-5,5'-dione
[$\Delta^{2,2'(5H,5'H)}$-bi(beta-naphthylfuran)]-5,5'-dione
[$\Delta^{2,2'(5H,5'H)}$-bi(chlorophenylfuran)]-5,5'-dione
[$\Delta^{2,2'(5H,5'H)}$-bi(o-methoxyphenylfuran)]-5,5'-dione When these substituted dilactones replace the dilactone of Example I in the process of Example I, there are obtained the corresponding substituted 1,8-octanedioic acids, i. e., the corresponding substituted suberic acids.

The process of this invention is a marked advance over previously known methods for preparing 1,8-octanedioic acids, particularly suberic acid, in that it makes it possible to prepare suberic acid and substituted suberic acids in two steps from cheap, abundantly available acetylenes and carbon monoxide. Thus, the process not only makes suberic acid readily available at a potentially low cost, but also makes accessible other 1,8-octanedioic acids containing hydrocarbon substituents hitherto available only by tedious, complicated, expensive procedures.

Long chain dibasic acids such as suberic acid and substituted suberic acids, are valuable products for the preparation of polyesters which are fiber forming.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for preparing a 1,8-octanedioic acid which comprises hydrogenating, in solution in a polar organic solvent and in contact with a platinum catalyst, a dilactone represented by the general formula

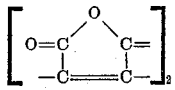

wherein one of the ring doubly bonded carbon atoms has its free valence satisfied by R and the other of the ring doubly bonded carbon atoms has its free valence satisfied by R', said R and R' being selected from the class consisting of hydrogen, alkoxyaryl where the alkoxy radical is not more than 12 carbon atoms and the aryl radical is hydrocarbon of not more than 10 carbon atoms, haloaryl where the aryl radical is hydrocarbon of not more than 10 carbon atoms, and monovalent hydrocarbon radicals, free from non-aromatic unsaturation, of not more than 12 carton atoms, and obtaining a 1,8-octanedioic acid as the resulting product.

2. Process for preparing suberic acid which comprises hydrogenating the dilactone [$\Delta^{2,2'(5H,5'H)}$-bifuran]-5,5'-dione in solution in a polar organic solvent and in contact with a platinum catalyst, and obtaining suberic acid as the resulting product.

3. Process for preparing suberic acid as set forth in claim 2 wherein said platinum catalyst is a platinum oxide catalyst.

4. Process for preparing suberic acid as set forth in claim 2 wherein said platinum catalyst is platinum chloride-on-charcoal.

5. Process for preparing suberic acid as set forth in claim 2 wherein said polar organic solvent is acetic acid.

6. Process for preparing suberic acid which comprises hydrogenating, at a temperature of 0 to 50° C., under a pressure from atmospheric to 500 lbs./sq. in., the dilactone [$\Delta^{2,2'(5H,5'H)}$-bufuran]-5,5'-dione in solution in a polar organic solvent and in contact with a platinum catalyst, and obtaining suberic acid as the resulting product.

7. Process for preparing suberic acid which comprises hydrogenating, at a temperature from room temperature of about 25° C. to 50° C., the dilactone [$\Delta^{2,2'(5H,5'H)}$-bifuran]-5,5'-dione in solution in a liquid polar organic solvent selected from the class consisting of acetic acid, dioxane, ethyl acetate, tetrahydrofuran, dimethylformamide and ethylene glycol diacetate, and in contact with a platinum catalyst, and obtaining suberic acid as the resulting product.

8. Process for preparing suberic acid which comprises hydrogenating, at a temperature of 0 to 50° C., under a pressure from atmospheric to 500 lbs./sq. in., the dilactone [$\Delta^{2,2'(5H,5'H)}$-bifuran]-5,5'-dione in solution in acetic acid and in contact with a platinum oxide catalyst, and obtaining suberic acid as the resulting product.

References Cited in the file of this patent

UNITED STATES PATENTS 2,484,497   Hagemeyer _____ Oct. 11, 1949

OTHER REFERENCES

Berkman et al.: Catalysis, 1940, page 818.